Patented Oct. 28, 1930

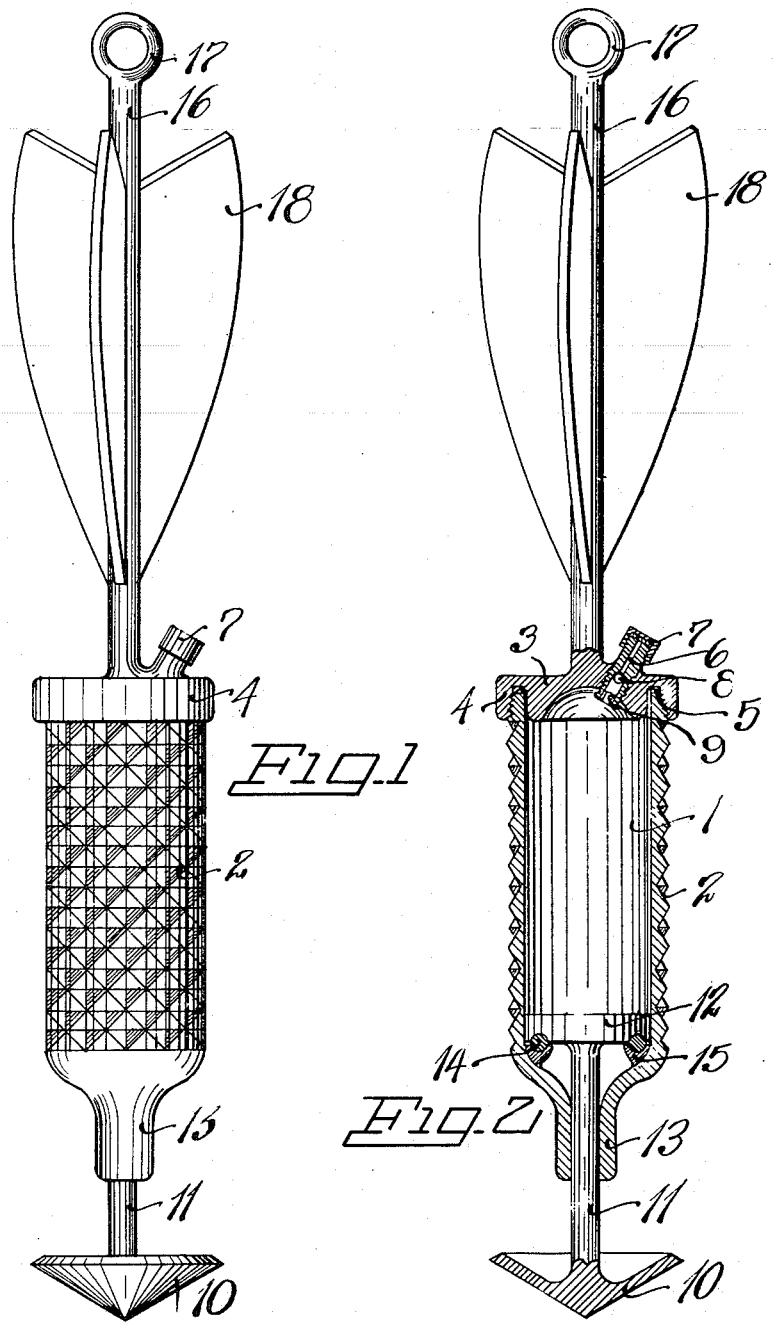

1,779,617

UNITED STATES PATENT OFFICE

AUGUST PAVOLA, OF McMURRAY, WASHINGTON

AERIAL GAS BOMB

Application filed August 6, 1928. Serial No. 297,722.

My present invention relates to improvements in aerial gas bombs which while designed for warfare, are especially adapted for use by forest patrols and others in extinguishing forest and other fires. The primary object of the invention is the provision of a gas bomb containing a gas under pressure which, when compressed to excessive degree, will burst asunder the walls of the bomb and then expand into the atmosphere. The bomb is filled with gas under suitable pressure that will insure safety in handling the bomb, and the excessive pressure for bursting the bomb is produced by contact with a striking head of the bomb against the ground or other surface. The bomb is designed to be carried by an airship, as an aeroplane, and is to be released from the airship to fall by gravity, and upon striking the ground, the bomb bursts and disseminates the expanding gas through the atmosphere. In this manner forest fires and other fires may be extinguished by the use of a suitable gas.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a view in elevation showing the aerial bomb of my invention. Figure 2 is a view similar to Figure 1, but with the bomb shown in section.

In carrying out my invention I utilize a cylinder 1 which is fashioned of frangible material and the exterior surface of the cylinder is cut away in suitable manner as indicated at 2, for the purpose of weakening the walls of the cylinder so that the walls will burst asunder when the gas is compressed within the cylinder and in case of warfare, the small fragments of the cylinder are blown about for death dealing purpose similar to shrapnel.

At one end the cylinder is provided with a head 3 fashioned with an internal flange 4 that is screwed on to the cylinder and a gas tight joint is attained by the use of a washer 5. The head 3 is provided with a nipple 6 through which gas under suitable pressure may be introduced to the cylinder and a closure or cap 7 is then screwed on the nipple. The nipple may be welded to the head and at its inner end it is provided with a check valve 8 in the form of a ball that is retained within the cage 9. It will be apparent that the cylinder may be filled with the expansible gas and subjected to a suitable, safe pressure. On the lower end of the bomb is carried a striking head 10 which is fashioned integral with a stem 11 that has a piston head 12 within the cylinder. The stem 11 is movable and guided in a sleeve 13, and it will be apparent that when the head 10 strikes the ground the weight of the bomb will force the sleeve 13 down on the stem, and the movement of the cylinder relative to the stationary piston head compresses the gas within the cylinder so that the compressed gas will burst asunder the frangible wall of the cylinder, release the gas, and the latter then expands to permeate the atmosphere.

When the charge of compressed gas is supplied to the cylinder the piston 12 is located in position in Figure 2 and resting upon a gasket 14 which is supported in an annular flange 15 that is welded at the lower end of the interior of the cylinder. The gasket 14 makes an air tight joint to prevent escape of the charge in the cylinder.

The head 3 is provided with a suspending bar 16 for the bomb and this bar is formed with an eye 17 by which the bomb may be suspended from the air craft. Suitable means may be employed for releasing the bomb at the proper time. The bomb is provided with veins 18 rigid with the bar 16 for stabilizing the movement of the bomb as it falls to the ground.

Having thus fully described my invention, what I claim as new and desire to secure by Letters Patent is:

1. The combination in an aerial bomb having a frangible cylinder, of a head for the cylinder and means for charging the cylinder with an expansive gas, a piston within the cylinder having a stem, and a striking head on the stem exterior of the cylinder.

2. In an aerial bomb the combination with a cylinder having frangible walls, a head, and means in the head for charging the cylinder with an expansive gas, of a piston within the cylinder and a stem for the piston, an exterior striking head on the stem, a suspending bar for the bomb, and guide veins on said bar.

In testimony whereof I affix my signature.
AUGUST PAVOLA.